United States Patent
Bresnahan et al.

(10) Patent No.: US 9,014,960 B2
(45) Date of Patent: Apr. 21, 2015

(54) METHOD OF OPERATING A NAVIGATION SYSTEM

(75) Inventors: Gregg A. Bresnahan, Wheaton, IL (US);
Aferdite Muci, Carol Stream, IL (US);
Pamela A. Sparks, Bartlett, IL (US);
Laura M. Traven, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 687 days.

(21) Appl. No.: 12/748,729

(22) Filed: Mar. 29, 2010

(65) Prior Publication Data

US 2011/0238292 A1  Sep. 29, 2011

(51) Int. Cl.
  *G01C 21/36* (2006.01)
  *G01C 21/34* (2006.01)

(52) U.S. Cl.
  CPC ................................ *G01C 21/3407* (2013.01)

(58) Field of Classification Search
  CPC .. G08G 1/087; G08G 1/149; G08G 1/096716
  USPC ............. 701/1, 3, 117, 411, 431; 340/995.27, 340/998; 709/219
  See application file for complete search history.

(56) References Cited

U.S. PATENT DOCUMENTS

| | | | | |
|---|---|---|---|---|
| 4,311,876 A * | 1/1982 | Endo et al. | ............... | 455/456.5 |
| 5,057,835 A * | 10/1991 | Factor et al. | .............. | 340/995.27 |
| 5,515,283 A * | 5/1996 | Desai et al. | ................... | 701/461 |
| 5,579,535 A * | 11/1996 | Orlen et al. | ................... | 455/421 |
| 5,586,030 A * | 12/1996 | Kemner et al. | ................ | 701/23 |
| 5,720,363 A * | 2/1998 | Kipp | ............................. | 186/55 |
| 6,028,537 A * | 2/2000 | Suman et al. | ................. | 340/988 |
| 6,091,956 A * | 7/2000 | Hollenberg | ............... | 455/456.5 |
| 6,119,013 A * | 9/2000 | Maloney et al. | .......... | 455/456.2 |
| 6,212,472 B1 * | 4/2001 | Nonaka et al. | ................ | 701/431 |
| 6,212,474 B1 * | 4/2001 | Fowler et al. | ................ | 701/440 |
| 6,282,491 B1 | 8/2001 | Bochmann et al. | .......... | 701/209 |
| 6,411,895 B1 * | 6/2002 | Lau et al. | ...................... | 701/425 |
| 6,587,785 B2 * | 7/2003 | Jijina et al. | .................... | 701/414 |
| 6,700,504 B1 * | 3/2004 | Aslandogan et al. | ......... | 340/901 |
| 6,763,299 B2 * | 7/2004 | Jones | ............................ | 701/465 |
| 6,889,137 B1 * | 5/2005 | Rychlak | ....................... | 701/410 |
| 7,010,583 B1 * | 3/2006 | Aizono et al. | ................ | 709/219 |
| 7,142,979 B1 * | 11/2006 | Shonk | ............................ | 701/446 |
| 7,395,151 B2 * | 7/2008 | O'Neill et al. | ................ | 701/411 |
| 7,516,010 B1 | 4/2009 | Kaplan et al. | ............... | 701/209 |
| 8,350,721 B2 * | 1/2013 | Carr | ............................... | 340/903 |
| 2004/0073355 A1 * | 4/2004 | Yates | ............................ | 701/117 |
| 2004/0155795 A1 * | 8/2004 | Quintana | ..................... | 340/902 |
| 2005/0164673 A1 * | 7/2005 | Ehlers | ........................ | 455/404.1 |
| 2005/0216184 A1 * | 9/2005 | Ehlers | ......................... | 701/200 |
| 2005/0267651 A1 * | 12/2005 | Arango et al. | .................... | 701/3 |
| 2007/0299595 A1 * | 12/2007 | Boldin | ......................... | 701/117 |
| 2010/0082180 A1 * | 4/2010 | Wright et al. | ..................... | 701/1 |

* cited by examiner

*Primary Examiner* — Hiep V Nguyen
*Assistant Examiner* — Teresa Williams
(74) *Attorney, Agent, or Firm* — Lempia Summerfield Katz LLC (57) ABSTRACT

A method of operating a navigation system is disclosed. A request for an emergency stop for a vehicle is obtained. The current position of the vehicle is determined and an emergency profile representing a time until stop is generated. A maximum distance that may be traveled within said time until stop is determined and an emergency stop location within the maximum distance is identified.

17 Claims, 6 Drawing Sheets

METHOD OF OPERATING A NAVIGATION SYSTEM

BACKGROUND OF THE INVENTION

The present invention relates to a method and system for operating a navigation system, and more particularly to a method and system for identifying where to stop a vehicle in an emergency situation.

Navigation systems are available that provide end users with various navigation-related functions and features. For example, some navigation systems are able to determine an optimum route to travel along a road network from an origin location to a destination location in a geographic region. Using input from the end user, the navigation system can examine various potential routes between the origin and destination locations to determine the optimum route. The navigation system may then provide the end user with information about the optimum route in the form of guidance that identifies the maneuvers required to be taken by the end user to travel from the origin to the destination location. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. One area in which there is room for improvement relates to stopping a vehicle during an emergency situation, such as a flat tire, engine trouble, driver or passenger illness, extreme weather and after an accident. For example, during the emergency, identifying a safe place to pull over and stop the vehicle is difficult. Accordingly, it would be beneficial to provide a recommendation for a place to stop a vehicle during an emergency situation.

SUMMARY OF THE INVENTION

To address these and other objectives, the present invention comprises a method of operating a navigation system. The method obtains a request for an emergency stop for a vehicle that is currently traveling on a road network and determines a current position of the vehicle. The method builds an emergency profile representing a time until the emergency stop is needed and determines a maximum distance that may be traveled within the time. The method identifies an emergency stop location within the maximum distance.

According to another aspect, the present invention comprises a navigation system. The navigation system comprises a processor, a geographic database associated with the processor, and an emergency stop program executed on the processor. The emergency stop program obtains a request for an emergency stop, determines a current position of the navigation system, and obtains data from the geographic database to identify an emergency stop location.

According to a further aspect, the present invention comprises a method of operating a navigation system. The method obtains a request for an emergency stop from an occupant of a vehicle and obtains data from a geographic database associated with the navigation system representing at least two candidate emergency stop locations. The candidate emergency stop location that provides greater safety for the occupant of the vehicle is selected as an emergency stop location.

BRIEF DESCRIPTION OF THE DRAWINGS

An exemplary embodiment of the present invention is described herein with reference to the following drawings.

DETAILED DESCRIPTION OF THE PRESENTLY PREFERRED EMBODIMENTS

I. Navigation System

Figure 1:
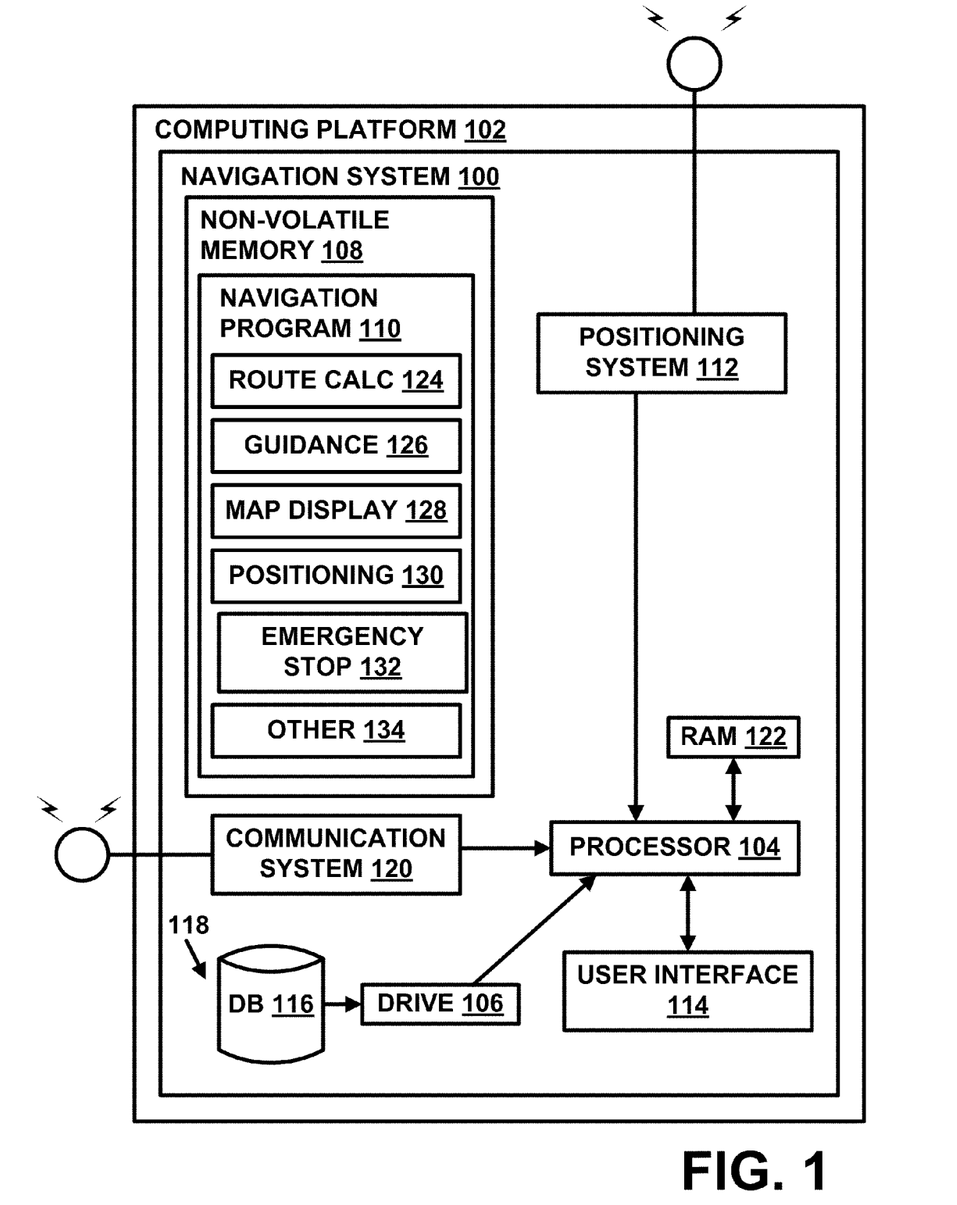
FIG. 1 is a block diagram of a navigation system, according to an exemplary embodiment.

FIG. 1 is a block diagram of a navigation system 100 associated with a computing platform 102, such as an in-vehicle navigation device, a personal navigation device, a mobile computer, mobile telephone, personal digital assistant (PDA), personal computer, or any other computer, according to an exemplary embodiment. The navigation system 100 is a combination of hardware and software components. In one embodiment, the navigation system 100 includes a processor 104, a drive 106 connected to the processor 104, and a non-volatile memory storage device 108 for storing navigation application software programs 110 and possibly other information.

The navigation system 100 also includes a positioning system 112. The positioning system 112 may utilize GPS-type technology, a dead reckoning-type system, or combinations of these or other systems, all of which are known in the art. The positioning system 112 may include suitable sensing devices that measure the traveling distance speed, direction, orientation and so on. The positioning system 112 may also include a GPS system. The positioning system 112 outputs a signal to the processor 104. The navigation application software programs 110 that run on the processor 104 use the signal from the positioning system 112 to determine the location, direction, orientation, etc., of the computing platform 102.

The navigation system 100 also includes a user interface 114 that allows the end user to input information into the navigation system 100 and obtain information from the navigation system 100. The input information may include a request for navigation features and functions of the navigation system 100. To provide navigation features and functions, the navigation system 100 uses a geographic database 116 stored on a computer readable storage medium 118. In one embodiment, the storage medium 118 is installed in the drive 106 so that the geographic database 116 can be read and used by the navigation system 100. In one embodiment, the geographic database 116 may be a geographic database published by NAVTEQ North America, LLC of Chicago, Ill. The storage medium 118 and the geographic database 116 do not have to be physically provided at the location of the navigation system 100. In alternative embodiments, the storage medium 118, upon which some or the entire geographic database 116 is stored, may be located remotely from the rest of the navigation system 100 and portions of the geographic data provided via a communications system 120, as needed.

In one exemplary type of system, the navigation application software programs 110 load from the non-volatile memory storage device 108 into a random access memory (RAM) 122 associated with the processor 104. The processor 104 also receives input from the user interface 114. The navigation system 100 uses the geographic database 116 stored on the storage medium 118, possibly in conjunction with the outputs from the positioning system 112 and the communications system 120, to provide various navigation features and functions. The navigation application software programs 110 may include separate applications (or subprograms) that provide the various navigation-related features and functions. The navigation functions and features may include route calculation 124 (wherein a route from an origin to a destination is determined), route guidance 126 (wherein detailed directions are provided for reaching a desired destination), map display 128 (wherein a map depicting the current position and route to travel are shown on a display), and positioning 130 (e.g., map matching). Other functions and programming 134 may be included in the navigation system 100 including people and business finding services (e.g., electronic yellow and white pages), point of interest searching, destination selection, and location base advertising services.

The navigation application software programs 110 may be written in a suitable computer programming language such as C, although other programming languages, such as C++ or Java, are also suitable. All of the components described above may be conventional (or other than conventional) and the manufacture and use of these components are known to those of skill in the art.

In alternative embodiments, the navigation system 100 includes local components, located physically with an end user, that communicate with remote components, located remotely from the end user. In this embodiment, the remote components include a navigation services server. The navigation application software programs 110 and the geographic database 116 reside with the navigation server. The local components of the navigation system communicate with the remote components via a communication link. The communication link may use any suitable technology and/or protocols that are currently available, as well as technology and/or protocols that become available in the future. A portion of the communications link may include a wireless portion that enables two-way communication between the local components and the remote components. The wireless portion may be implemented by any suitable form of wireless communication, including cellular, PCS, satellite, FM, radio, Bluetooth®, other long and short range transmission technologies or technologies that may be developed in the future.

II. Geographic Database

Figure 2A:
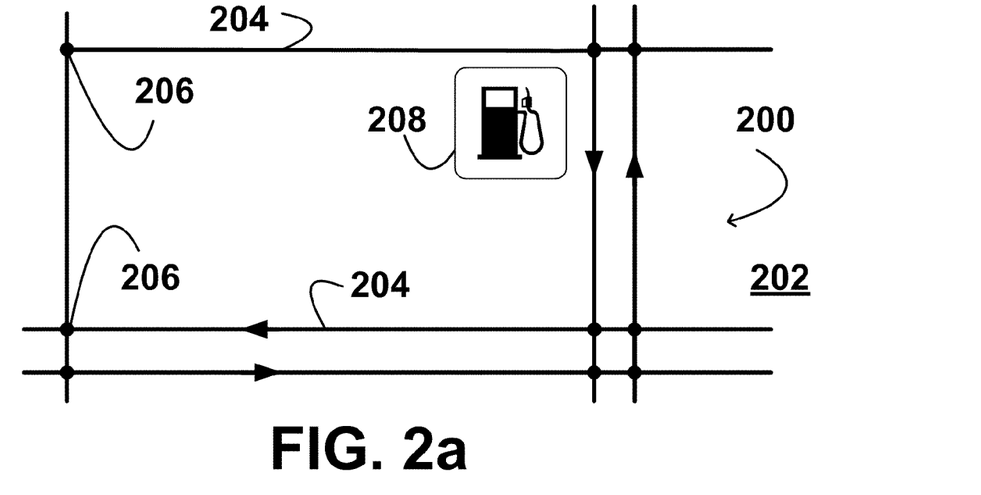
FIGS. 2a and 2b show maps of a portion of a geographic region.
Figure 2B:
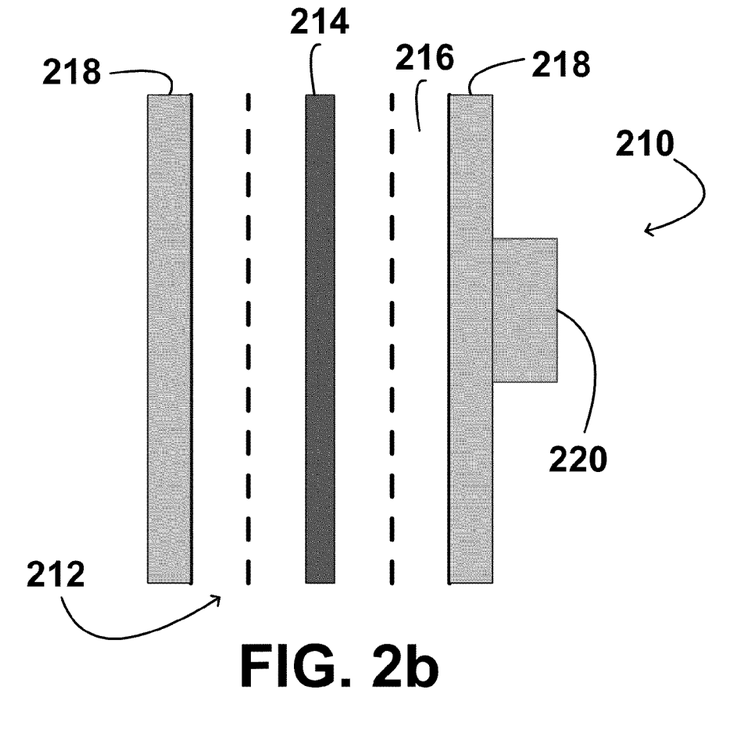

In order to provide navigation-related features and functions to the end user, the navigation system 100 uses the geographic database 116. The geographic database 116 includes information about one or more geographic regions. FIGS. 2a and 2b illustrate maps 200 and 210 of a portion of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

The map 200 illustrates part of a road network in the geographic region 202. The road network includes, among other things, roads and intersections located in the geographic region 202. Each road in the geographic region 202 is composed of one or more road segments 204. A road segment 204 represents a portion of the road. Each road segment 204 is shown to have associated with it two nodes 206; one node represents the point at one end of the road segment and the other node represents the point at the other end of the road segment. The node 206 at either end of a road segment 204 may correspond to a location at which the road meets another road, i.e., an intersection, or where the road dead-ends. The road segments 204 may include sidewalks and crosswalks for travel by pedestrians. The geographic region 202 also includes points of interest, such as businesses, facilities, restaurants, hotels, gas stations, stadiums, police stations, and so on. Referring to FIG. 2a, the geographic region 202 includes a gas station 208.

Referring to FIG. 2b, a map 210 illustrates part of a road segment corresponding to a four lane highway 212. The four lane highway 212 includes a barrier 214 separating lanes 216 providing for vehicle traffic in opposite directions. The highway 212 also includes shoulders or aprons 218 on one side of the lanes 216. Also included on the four lane highway is an emergency stopping site 220. The emergency stopping site 220 is an officially area designated by the highway authority as a location for stopping a vehicle during an emergency situation. The emergency stopping site 220 provides space for a vehicle that is traveling on the highway 212 to stop and safely avoid other vehicles traveling on the highway 212. The emergency stopping site 220 is designated by posted signs and may also function as an officially designated accident investigation site. In the event of an emergency, the shoulder or apron 218 can also provide a location for an emergency stop.

Figure 3:
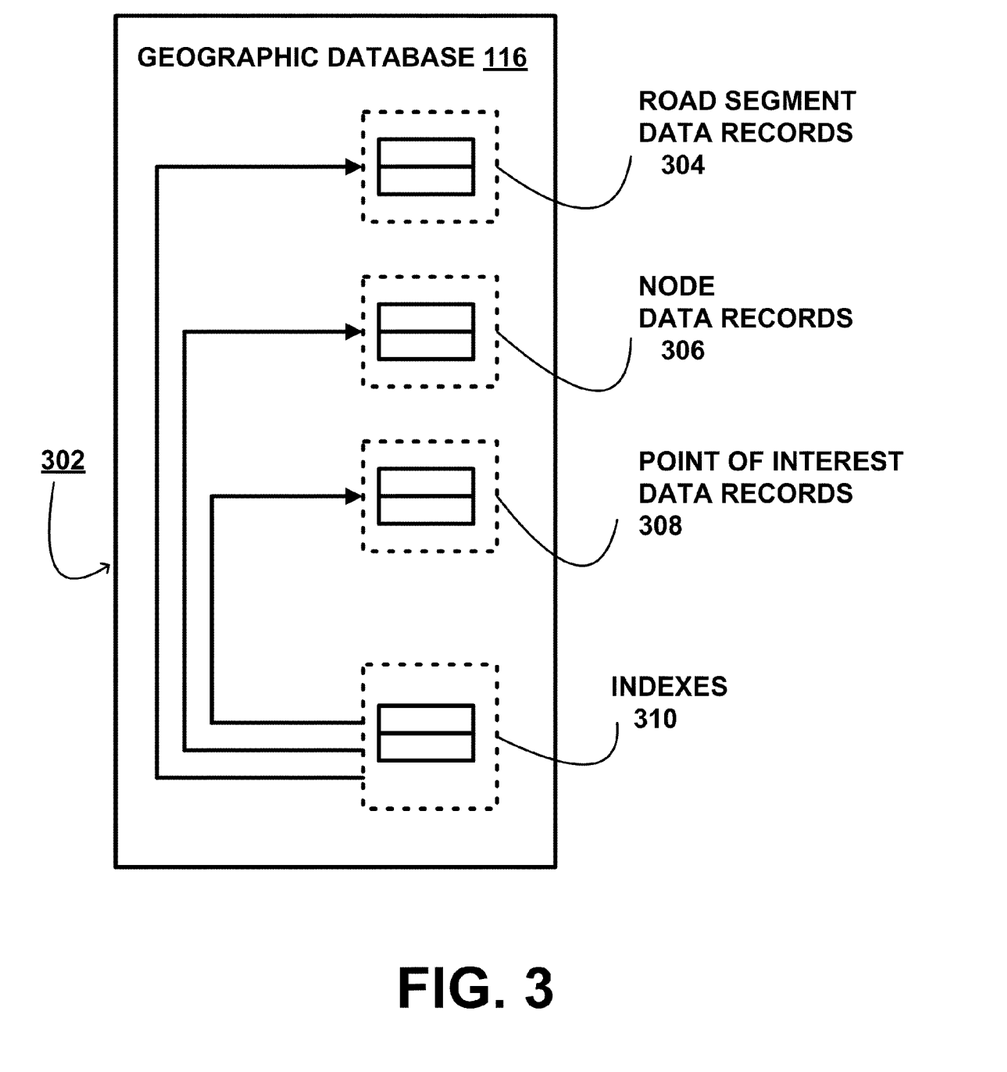
FIG. 3 is a block diagram of a geographic database that represents the geographic region included in the navigation system depicted in FIG. 1.

Referring to FIG. 3, the geographic database 116 contains data 302 that represents some of the physical geographic features in the geographic region 202 depicted in FIG. 2. The data 302 contained in the geographic database 116 includes data that represent the road network for travel by vehicles. In the embodiment of FIG. 3, the geographic database 116 that represents the geographic region 202 contains at least one road segment data record 304 (database record may also be referred to as "entity" or "entry") for each road segment 204 in the geographic region 202. The geographic database 116 that represents the geographic region 202 also includes a node data record 306 for each node 206 in the geographic region 202. The terms "nodes" and "segments" and "links" represent only one terminology for describing these physical geographic features, and other terminology for describing these features is intended to be encompassed within the scope of these concepts. The geographic database 116 also contains point of interest data records 308 that represent points of interest, such as businesses, facilities, restaurants, hotels, gas stations, stadiums, police stations, and so on. The point of interest data may include point of interest records comprising a type of point of interest, location of the point of interest, a phone number, hours of operation, etc.

Figure 4:
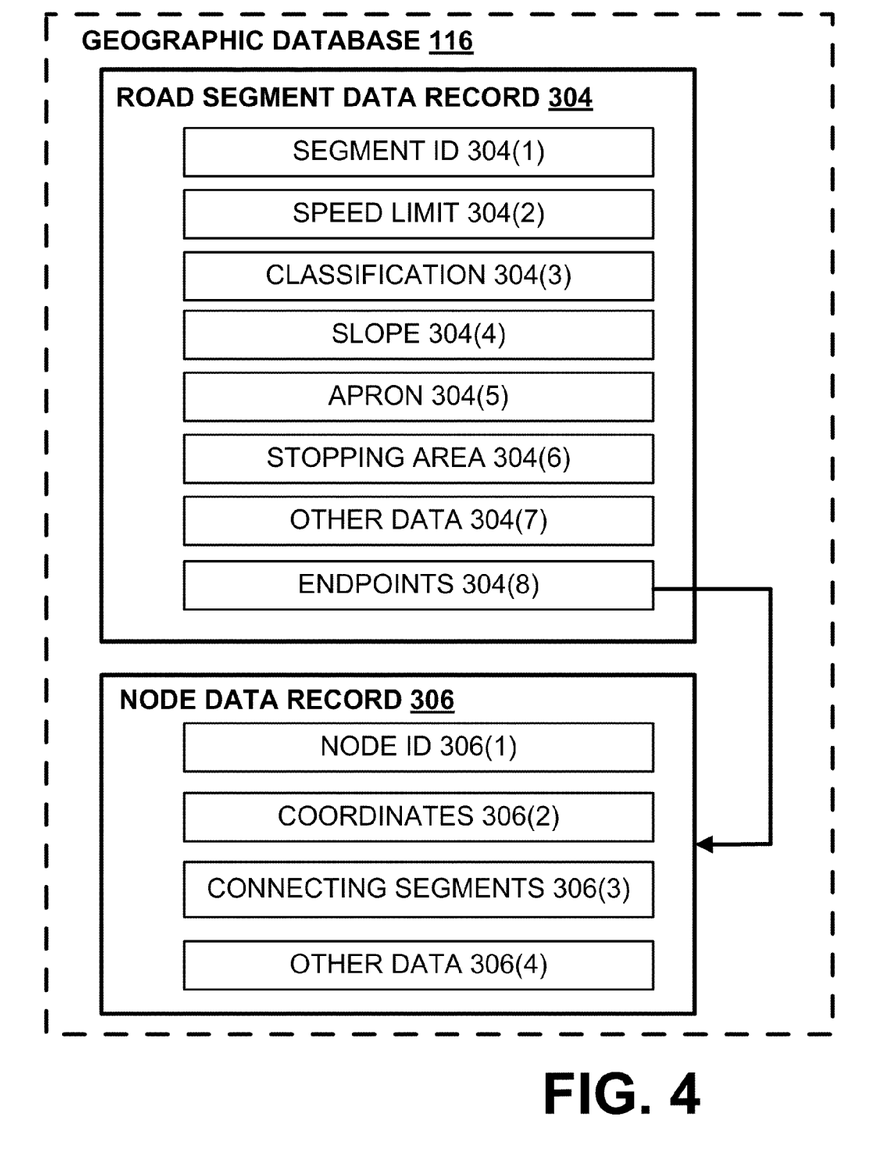
FIG. 4 is a block diagram of components of data records contained in the geographic database depicted in FIG. 3.

FIG. 4 shows some of the components of a road segment data record 304 contained in the geographic database 116. The road segment data record 304 includes a segment ID 304(1) by which the data record can be identified in the geographic database 116. Each road segment data record 304 has associated with it information (such as "attributes", "fields", etc.) that describes features of the represented road segment. The road segment data record 304 may include data 304(2) that indicate a speed limit or speed category (i.e., the maximum permitted vehicular speed of travel) on the represented road segment. The road segment data record 304 may also include data 304(3) that indicate a classification such as a rank of a road segment that may correspond to its functional class that indicates whether the road segment is a highway, residential road and so on. The road segment data record also includes data 304(4) that indicate the slope or grade of the road segment in the direction of vehicle travel. Additionally, the data may indicate the superelevation that provides the angle of the road segment perpendicular to the direction of vehicle travel.

The road segment data record also includes data 304(5) that indicate whether a shoulder or apron is present as well as attribute information for the apron. The apron data 304(5) indicates whether the apron is present on the left side, right side or both sides of the road. The apron data 304(5) may indicate a length and width of the apron as well as the type surface, such as paved/unpaved, gravel, grass, dirt, partial paved, partial gravel. The apron data 304(5) may further indicate whether a curb (as well as curb height), guard rail, ditch, grass, trees are adjacent to the apron.

The road segment data record also includes data 304(6) that indicate whether a designated emergency stopping area is present as well as attribute information for the designated emergency stopping area. The stopping area data 304(6) may indicate a location of the designated emergency stopping area including side of the road, distance from end nodes of the road segment or latitude and longitude coordinates. The stopping area data 304(6) may indicate a length and width of the stopping area as well as the type of surface, such as paved/unpaved, gravel, grass, dirt, partial paved, partial gravel. The stopping area data 304(6) may further indicate whether a curb (as well as curb height), guard rail, ditch, grass, trees are adjacent to the stopping area. The stopping area data 304(6) may also indicate the incline and/or superelevation of the stopping area.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying the number of lanes and the width of the lanes comprising the road segment. The other day 304(7) may indicate what turn restrictions exist at each of the nodes which correspond to intersections at the ends of the road portion represented by the road segment, the name or names by which the represented road segment is known, the length of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The road segment data record 304 also includes data 304(8) identifying the endpoints of the road segment and the location (e.g., the latitude and longitude) of the endpoints. In one embodiment, the endpoint data 304(8) references node data records 306 defined for the nodes corresponding to the endpoints of the represented road segment. By convention, each road segment is considered to have a "reference" or "left" endpoint and a "non-reference" or "right" endpoint. The left endpoint may be the node having greater longitudinal coordinates, or in the case in which the longitudinal coordinates are the same, the node having the lesser latitude. Of course, which node is defined as the left or right endpoints can be alternatively defined.

Each node data record 306 includes a node ID 306(1) by which the record can be identified in the geographic database 116. The node data record 306 also includes data 306(2) identifying the geographic coordinates (e.g., the latitude, longitude, and optionally altitude) of the represented node. The node data record 306 also includes data 306(3) identifying road segments that connect to the node to form an intersection. For example, a node identified by a node ID 306(1) may represent an intersection of two roads. At the intersection, each of the two roads may be represented by two road segments (located on opposite sides of the center of the intersection) each having an endpoint at the node. In this example of a standard four-way intersection, the connecting segment data 306(3) includes four segments IDs 304(1) identifying the four road segments that connect to the node to form the intersection. The node data record 306 may also include other data 306(4) that refer to various other attributes of the nodes.

III. Emergency Stop

As discussed above in conjunction with FIG. 1, the navigation system 100 includes navigation application software programs 110 that provide the various navigation features and functions. In one embodiment, the navigation functions and features may include an emergency stop function 132. The emergency stop function 132 identifies an area that can be used to pull over and stop a vehicle during an emergency situation. Emergency situations include problems with the vehicle, such as engine trouble and flat tire, mechanical problems, need to investigate strange vehicle noise, driver or passenger illness, passenger misbehavior, extreme weather (hailstorms, severe thunderstorms, poor visibility), after an accident (collision with another vehicle) and other emergencies. During the emergency, the driver of the vehicle desires to timely find a safe and convenient emergency stop location. The emergency stop location should be a location that insures the safety of the vehicle, its occupants as well as the safety of any emergency responders. The emergency stop location provides a place where the vehicle can be stopped and alleviates traffic congestion by allowing other vehicle traffic to continue uninhibited without having to steer around a stopped vehicle.

Figure 5:
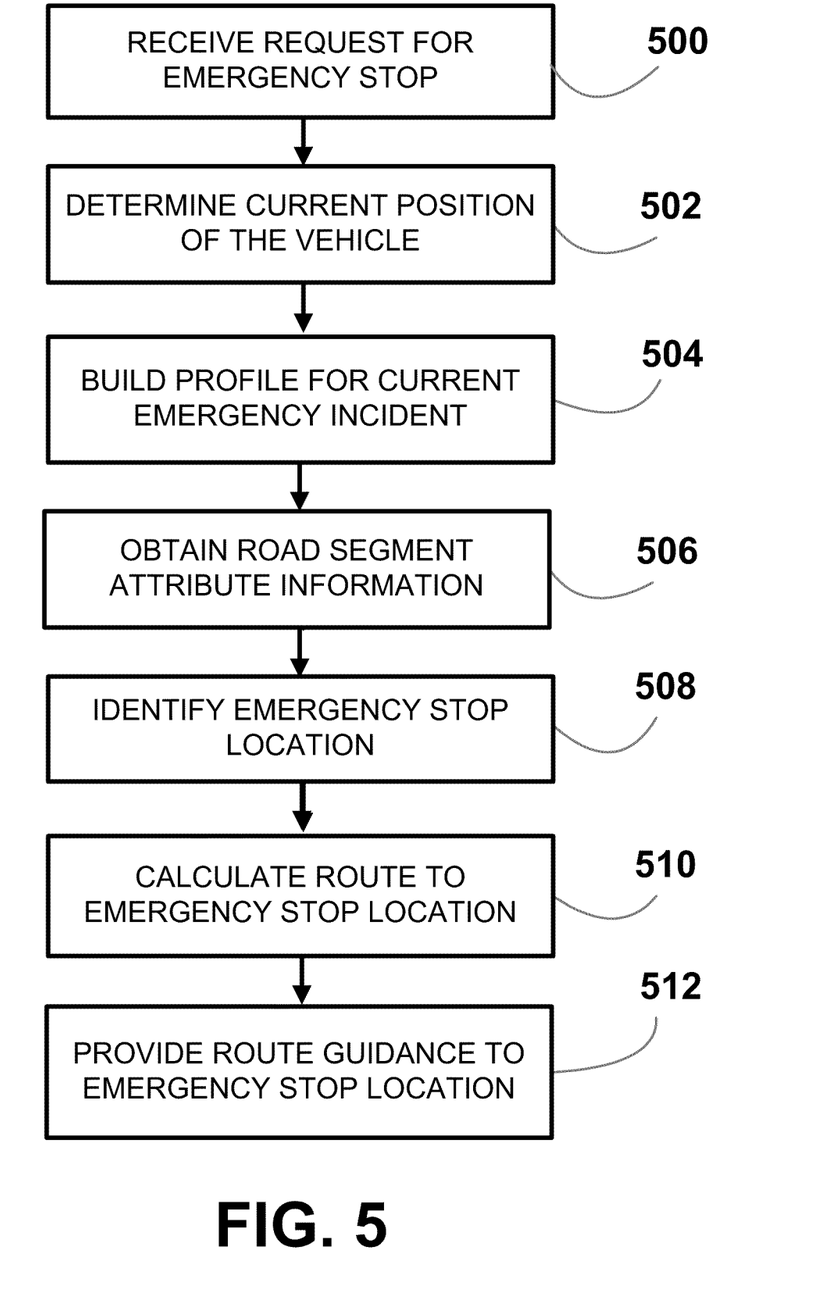
FIG. 5 is a flow chart for providing an emergency stop location.

FIG. 5 illustrates a flow chart of the steps for providing an emergency stop location. At step 500, the emergency stop function 132 obtains a request for an emergency stop location. In one embodiment, the vehicle driver or a passenger enters the request for an emergency stop using the user interface 114 of the navigation system 100. The driver or passenger may enter the request for the emergency stop through a voice command, via a touch screen, via a keypad or via dedicated emergency stop button. The request for the emergency stop may indicate a level of the emergency, such as immediate stop required, urgent stop such as a need to stop within one minute, or less urgent stop within five minutes. Additionally, the request for the emergency stop may indicate a reason for the emergency stop, such as a flat tire, vehicle mechanical problems or illness.

In another embodiment, the emergency stop function 132 obtains the request for the emergency stop from on-vehicle sensors. For example, the on-vehicle sensor may indicate engine trouble and provide the level of the emergency as an urgent stop with a need to stop within one minute. Additionally, the on-vehicle sensor may indicate that the vehicle has a flat tire and the level of the emergency is an immediate stop.

Furthermore, the on-vehicle sensors may indicate other mechanical and vehicle emergencies as well as the associated level of emergency.

Figure 6:
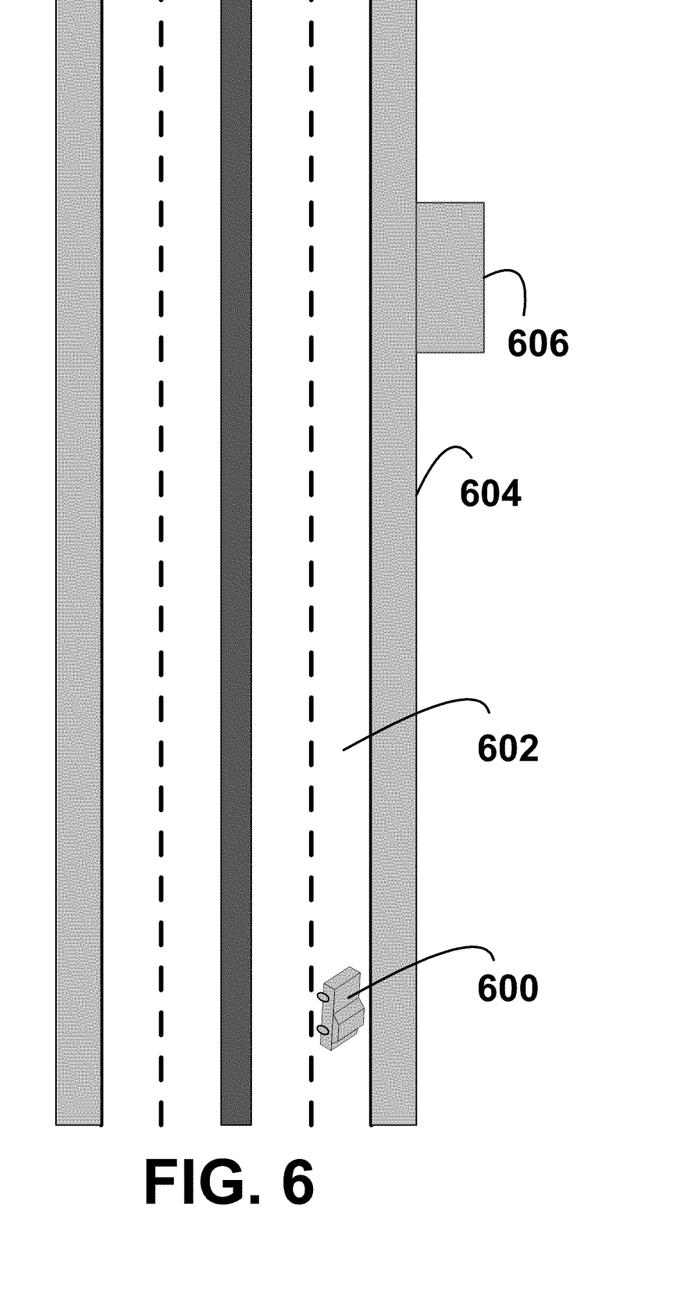
FIG. 6 shows a map of a portion of the geographic region.

At step 502, the emergency stop function 132 determines the current position of the vehicle. In one embodiment, the emergency stop function 132 obtains the current position of the vehicle from the positioning system 112 and positioning function 130. The positioning system 112 determines the location, direction, orientation, etc., of the vehicle. The positioning system 112 may provide latitude and longitude coordinates indicating the current position of the vehicle. The positioning function 130 uses information from the positioning system 112 to map match the latitude and longitude coordinates as well as direction to one of the road segments represented in the geographic database 116. In one embodiment, the emergency stop function 132 obtains the road segment ID 304(1) of the road segment on which the vehicle is currently traveling. FIG. 6 illustrates a vehicle 600 travelling on a road segment 602. The emergency stop function 132 obtains the road segment ID 304(1) of the road segment 602 and the direction of travel of the vehicle 600.

At step 504, the emergency stop function builds a profile for the current emergency incident based upon the request for the emergency stop, including the level of emergency, information from on-vehicle sensors, reason for the emergency stop request and other information. The profile for the current emergency incident identifies the characteristics needed to be satisfied by the emergency stop location, including time available until stop required and features needed at stop location, such as easy for emergency responders to find, type of surface of stop location, clearance of stop location from other traffic, safety considerations of traffic volume and traffic speed, size needed for stop location considering length, width and clearance of vehicle. For example, in the case of a flat tire, the stop location should be sized to accommodate the length and width of the vehicle, solid or paved, with a low slope or incline and spaced safely away from passing traffic.

In one embodiment, the emergency stop function 132 uses the level of emergency of the profile to calculate a search area for the emergency stop location. The search area is calculated as a maximum distance from the current position of the vehicle that may be traveled within the time associated with the level of emergency. For example, the time for the immediate stop is up to 15 seconds, the time for urgent stop is up to 1 minute and the time for less urgent stop is up to 5 minutes. The maximum distance from the current position of the vehicle is calculated using the time associated with the level of emergency and the current traveling speed of the vehicle available from on-vehicle sensors or the speed limit data 304(2) for the road segment on which the vehicle is currently traveling and upcoming road segments. For example, if the driver of the vehicle requests an urgent stop (within one minute) while traveling at 55 miles per hour, the maximum distance from the current position of the vehicle is approximately 0.92 miles. The calculated maximum distance may be reduced to account for the vehicle reducing speed prior to stopping.

At step 506, the emergency stop function 132 obtains road segment attribute information from the geographic database 116 for the road segment on which the vehicle is currently traveling. Depending on the size of the search area, the emergency stop function 132 also obtains road segment attribute information for upcoming connected road segments that are within the maximum distance of the search area. In one embodiment, the emergency stop function 132 obtains data 304(6) that indicate whether a designated emergency stopping area is present on the road segment(s) with the search area. If the emergency stopping area is present, the emergency stop function 132 obtains attribute information of the emergency stopping area. In another embodiment, the emergency stop function 132 obtains data indicating the type of road segment and features of the road segment including classification data 304(3) representing the functional class of the road segment, such as a highway, speed limit data 304(2), slope data 304(4), data 304(5) indicating an apron as well as attribute information of the apron and so on.

At step 508, the emergency stop function 132 identifies an emergency stop location for the vehicle. The emergency stop function 132 identifies the emergency stop location as a safe and timely place to pull the vehicle off of the road network and away from other vehicle traveling on the road network. More specifically, the emergency stop function 132 identifies the emergency stop location to satisfy the profile of the current emergency incident or to satisfy as many characteristics of the profile as possible. The emergency stop function 132 uses the obtained road segment attribute information to identify at least one candidate emergency stop location within the maximum distance of the profile.

For example, the emergency is a flat tire that requires an immediate stop as well as a stop location that has a low incline, a solid or paved surface, size that accommodates the length and width of the vehicle and a distance away from passing vehicles that would allow the driver to exit the vehicle, access the spare tire from the vehicle's trunk and replace the flat tire with the spare tire. Referring to FIG. 6, the emergency stop function 132, using the attribute information for road segment 602 on which the vehicle 600 is traveling, identifies possible stop locations within the maximum distance calculated for an immediate stop of the apron 604 on the right side of the road segment 602 and a designated emergency stopping area 606 a short distance ahead of the vehicle 600. The emergency stop function 132 then evaluates the possible stop locations of the apron 604 and the designated emergency stopping area 606 to determine whether these locations provide the low incline, solid paved surface and distance away from passing vehicles. For example, the attribution information of the apron data 304(5) for the apron 604 indicates that the apron width is two feet; however, the vehicle 600 has a width of three feet. Accordingly, the emergency stop function 132 would rule out the apron 604 as a candidate stop location because the profile of size and space from passing traffic cannot be met by the apron 604. The attribute information of the designated stopping area 304(6) indicates a paved surface, a width of 6 feet, length of 15 feet and curb height of 3 inches for the designated stopping area; additionally, the slope data 304(4) for the road segment 602 indicates a flat surface. Accordingly, the emergency stop function 132 identifies the designated stopping area 606 as a candidate location. For this example, because the designated stopping area 606 is the only candidate location, the emergency stop function 132 identifies the designated stopping area 606 as the emergency stop location.

When the emergency stop function 132 identifies more than one candidate emergency stop location, the emergency stop function 132 determines the cost associated with each of the candidate locations. The cost refers to the measurable value that is being minimized during a search for the emergency stop location. The cost may be configurable to provide an emergency stop location that minimizes safety risks, minimizes distance, minimizes travel time and so on. For example, it is desirable to find the closest emergency stop location, and therefore distance to the stop location is the cost item being minimized. If the quickest emergency stop location is desired, travel time to the stop location is the cost item being minimized. If the safest emergency stop location is desired, safety considerations, such as interaction with other vehicles, are the cost items being minimized. Other kinds of cost items may be selected, including custom cost functions that incorporate combinations of various factors. The following paragraphs describe additional factors or attributes to consider when computing cost values of the candidate locations.

In one embodiment, the emergency stop function 132 evaluates the attributes of the candidate stop locations to consider safety of the location to minimize the safety cost. When determining the safety cost of the candidate location, the emergency stop function 132 applies weights to the different attributes or cost items constituting safety to determine a safety cost. Information considered when computing the safety cost is obtained from the geographic database and/or another database. For safety considerations, the emergency stop function 132 provides cost items that favor designated stopping areas over road aprons. Additionally, safety cost items favor road segments or portions of road segments having a lower speed limit, lower traffic volume (that may be obtained from historic traffic data or real time traffic information), and lower accident statistics. Additionally, safety cost items favor road segments or portions of road segments from which the emergency stop location may be readily visible to other vehicles. Accordingly, stop locations located after a hill peak, after a curve, after an intersection or other black spot are avoided. Moreover, emergency stop locations that provide ample clearance between the stopped vehicle and passing vehicle are favored. Moreover, stop locations in tunnels or on bridges are avoided.

In addition to safety considerations, the emergency stop function 132 may consider whether the emergency stop location is readily reachable by emergency responders, such as an ambulance or tow truck. Accordingly, a stop location proximate a distance marker is favored because this marker may be referenced when reporting location to the responder. Additionally, a stop location proximate an emergency phone location is also favored. Moreover, a stop location that may better satisfy the profile is favored. For example, if the emergency is to investigate an odd vehicle noise, the emergency stop function 132 favors points of interest, such as a gas station with service area.

At step 510, the route calculation function 124 calculates a route to the emergency stop location identified by the emergency stop function 132. In one embodiment, the route calculation function 124 obtains data representing the location of the emergency stop location from the output of the emergency stop function 132 that references data representing the location in the geographic database 116 and uses the location of the emergency stop location as the new destination of the route. The route calculation function 124 determines a solution route for travel from the current position of the vehicle to the emergency stop location. The solution route comprises a series of connected road segments that lead to the emergency stop location.

When the route calculation function 124 calculates the route, it accesses the geographic database 116 and obtains the road segment data records 304 and/or other data. The route calculation function 124 may use various means or algorithms in determining solution routes. Methods for route calculation are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

The route calculation function 124 provides an output. In one embodiment, the output of the route calculation function 124 is in the form of an ordered list identifying a plurality of road segments, such as the road segment IDs 304(1) (i.e., seg1, seg2, seg3, . . . , seg(E), seg(F)) from the geographic database 116. The plurality of road segment IDs 304(1) represents the road segments that form the continuous navigable route between the current vehicle location and the emergency stop location that had been calculated by the route calculation function 124.

At step 512, the navigation system 100 provides route guidance comprising maneuvers for following the route to the emergency stop location. The route guidance function 126 uses the output from the route calculation function 124 to provide maneuver instructions for travel to the emergency stop location on the calculated route. The route guidance function 126 generates an output comprised of a series of maneuvers derived from the list of road segments provided in the output of the route calculation function 124. The output of the route guidance application is provided through the user interface 114 of the navigation system 100. The output of the route guidance may be conveyed audibly through speech synthesis or on a visual display. Using data that indicate the navigation system's current position, the route guidance function determines the appropriate times and locations at which to provide maneuvering instructions. The route guidance maneuvers instruct the user to turn in a specified direction at specified nodes (intersections) of the route. Methods for providing route guidance using geographic data are disclosed in U.S. Pat. No. 6,199,013, the entire disclosure of which is incorporated herein by reference. (The methods disclosed in the aforementioned patent represent only some of the ways that route guidance can be calculated and the claimed subject matter herein is not limited to any particular method of route guidance. Any suitable route guidance method now known or developed in the future may be employed.)

In one embodiment, the guidance function 126 generates guidance messages and safety messages. During the emergency situation, the driver may be under considerable stress and easily distracted. Accordingly, the navigation system 100 provides helpful safety messages along with the guidance messages. For example, if the vehicle must change lanes as part of the route to the emergency stop location, the safety message would instruct the driver to be cautious when changing lanes and remind the driver to check the blind spot.

Alternative embodiments for providing the emergency stop location are possible. In another embodiment, the emergency stop function is part of an automated driver assistance system (ADAS). In a further embodiment, the emergency stop function may be performed on a navigation services server remote from the vehicle.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A computer-implemented method of operating a navigation system comprising:

obtaining, by a processor of the navigation system, a request for an emergency stop for a vehicle that is currently traveling on a road network, the vehicle being in communication with the navigation system, wherein the road network is comprised of a plurality of road segments each representative of a portion of the road network, each being characterized by at least one attribute describing a geographic feature of the associated road segment, and wherein the request for the emergency stop was triggered by indications of an emergency detected by a sensor of the vehicle;

determining, by the processor, a current position of the vehicle using data generated by a positioning system of the navigation system and based on a signal communicated with a device external to the vehicle;

building, by the processor, an emergency profile comprising a time until the emergency stop and at least one road segment characteristic needed to be satisfied by an emergency stop location;

identifying, by the processor from a geographic database, the emergency stop location for the vehicle based on the emergency profile and the current position of the vehicle, wherein the identified emergency stop location comprises a road segment of the road network characterized by at least one attribute which satisfies the at least one road segment characteristic;

determining, by the processor, a route to the emergency stop location from the current position of the vehicle; and providing, by the navigation system, route guidance for following the route to the emergency stop location.

2. The method of claim 1 further comprising:
providing safety messages for following the route to the emergency stop location.

3. The method of claim 1 wherein the emergency stop location is a traffic authority designated stopping area on a highway.

4. The method of claim 1 wherein the emergency stop location is an apron having a width greater than a width of the vehicle.

5. The method of claim 1 wherein the at least one road segment characteristic needed to be satisfied by the emergency stop location is selected from the group comprising:
a size of the emergency stop location, a spacing of the emergency stop location from passing vehicles on the road network, an accessibility to an emergency responder, and a visibility from the road network.

6. The method of claim 1 wherein if multiple candidate emergency stop locations are within the maximum distance, selecting the emergency stop location that minimizes a safety risk to the vehicle.

7. The method of claim 1 wherein identifying an emergency stop location further comprises favoring a road segment characterized by the at least one attribute which satisfies the at least one road segment characteristic.

8. The method of claim 1 further comprising:
determining a maximum distance that may be traveled within said time until emergency stop; and
identifying an emergency stop location within the maximum distance.

9. A navigation system comprising:
a processor,
a positioning system configured to determine a position of a vehicle that is currently traveling on a road network based on a received signal,
a geographic database associated with the processor, wherein the geographic database comprises at least one data record associated with at least one geographic feature,
an emergency stop program executed on the processor, wherein the emergency stop program:
obtains a request for an emergency stop for the vehicle that is currently traveling on the road network, the request triggered by indications of an emergency detected by a sensor of the vehicle and including an emergency profile comprising a reason for the request for an emergency stop which indicates at least one road segment characteristic needed to be satisfied by an emergency stop location,
determines a current position of the navigation system using data generated by the positioning system, and
obtains data from the geographic database to identify the emergency stop location based on the location of the navigation system and the emergency profile, wherein the data comprises at least one road segment data record associated with a geographic feature which satisfies the at least one road segment characteristic;
a route determination program for determining a route from the current position to the emergency stop location, and
a route guidance program for providing guidance messages following the route to the emergency stop location.

10. The navigation system of claim 9 wherein the reason for the emergency stop include at least one selected from a group consisting of:
driver illness, passenger illness, passenger misbehavior, flat tire, mechanical problem, engine problem, and an accident.

11. The navigation system of claim 9 wherein the request for the emergency stop includes a maximum time to the emergency stop.

12. The navigation system of claim 9 wherein the identified emergency stop location minimizes a safety risk.

13. The navigation system of claim 9 wherein the identified emergency stop location is the closest emergency stop location.

14. A computer implemented method of operating a navigation system, the method comprising:
obtaining, through a user interface of the navigation system, a request for an emergency stop from an occupant of a vehicle, the request for the emergency stop comprising a level of emergency or a reason for the emergency;
determining, by a processor of the navigation system, a current position of the vehicle using data generated by a positioning system of the navigation system and based on a signal communicated with a device external to the vehicle;
obtaining, by the processor of the navigation system based on the current position of the vehicle, data from a geographic database associated with the navigation system representing at least two road segments, each road segment including a candidate emergency stop location having a characteristic that satisfy at least one characteristic of a profile for the emergency stop established based on the level of emergency or reason for the emergency;
selecting, by the processor, a road segment of the at least two road segments including a candidate emergency stop location that minimizes a safety cost calculation based on attributes of the at least two candidate stops; and providing, on a display of the navigation system, the selected emergency stop location to the occupant of the vehicle.

15. The method of claim 14 wherein the candidate emergency stop location that minimizes a safety cost calculation based on attributes of the at least two candidate stops is the candidate emergency stop location providing the greatest distance from passing traffic.

16. The method of claim 14 wherein the candidate emergency stop location that minimizes a safety cost calculation based on attributes of the at least two candidate stops is the candidate stop location adjacent a road segment having lower traffic speed.

17. The method of claim 14 wherein the candidate emergency stop location that minimizes a safety cost calculation based on attributes of the at least two candidate stops is the candidate emergency stop location adjacent a road segment having lower traffic volume.

* * * * *